No. 764,680. PATENTED JULY 12, 1904.
J. M. SAILER.
FEEDER FOR THRESHING MACHINES.
APPLICATION FILED JULY 21, 1902.
NO MODEL. 2 SHEETS—SHEET 2.
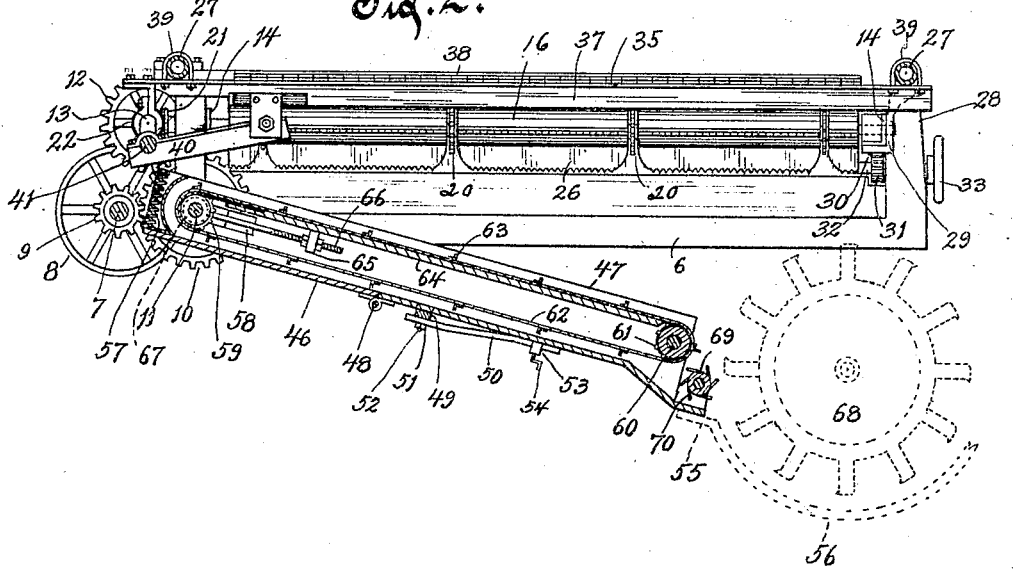
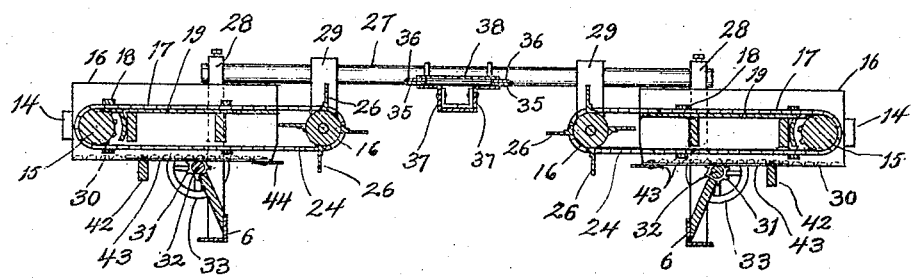
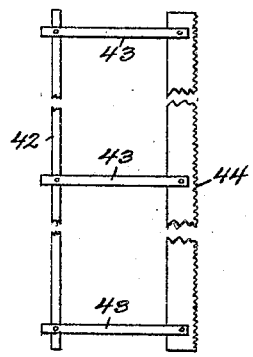
Witnesses.
C. H. Keeney.
Anna V. Faust.
Inventor.
John M. Sailer.
By Benedict & Morsell
Attorneys.

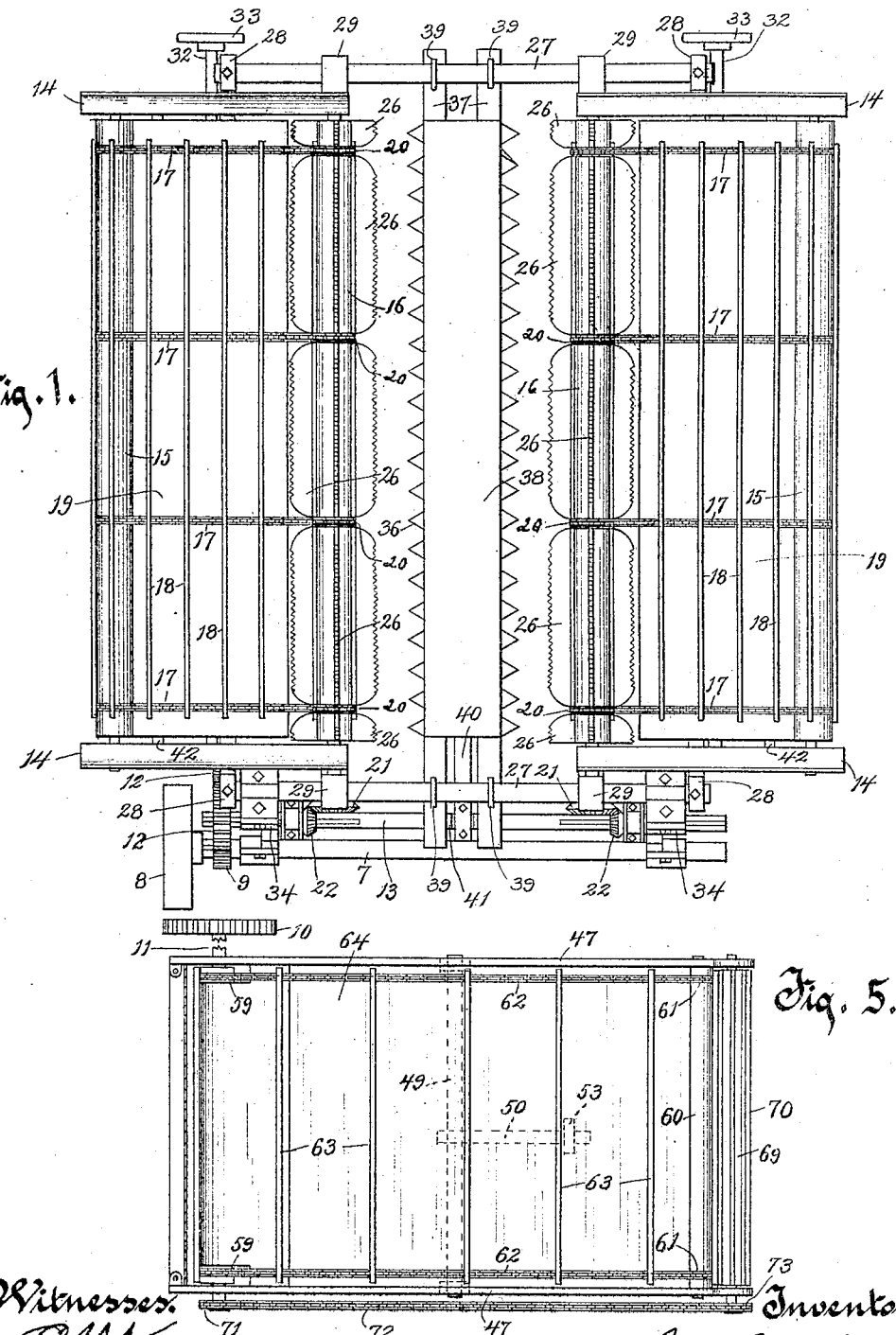

No. 764,680. Patented July 12, 1904.

UNITED STATES PATENT OFFICE.

JOHN M. SAILER, OF JANESVILLE, WISCONSIN.

FEEDER FOR THRESHING-MACHINES.

SPECIFICATION forming part of Letters Patent No. 764,680, dated July 12, 1904.

Application filed July 21, 1902. Serial No. 116,318. (No model.)

*To all whom it may concern:*

Be it known that I, JOHN M. SAILER, residing at Janesville, in the county of Rock and State of Wisconsin, have invented a new and useful Improvement in Feeders for Threshing-Machines, of which the following is a description, reference being had to the accompanying drawings, which are a part of this specification.

My invention has relation to improvements in feeders for threshing-machines.

One of the objects of the invention is to provide an improved form of carrier mechanism whereby the bundles of grain are carried inwardly thereby at a moderate force until they reach the end of their inward travel or until a point is reached in their travel where they are to be acted upon by the cutting mechanism and at which time the force at which they are carried along is greatly increased, so that the bundles are carried to the cutting mechanism with such force as to insure the effective operation of said cutting mechanism.

A further object resides in employing in conjunction with the specific means—*i. e.*, the inner roll having the radiating blades for accomplishing the above function—a means for preventing the grain from being twisted around said inner roll, and thereby clogging up the machine.

A still further object resides in providing a most simple form of conveying mechanism wherein the number of parts are reduced to the minimum and in connection therewith a simple means for preventing the cylinder from blowing the grain back beneath the endless-conveyer carrier and in providing for the catching of any loose grain and the depositing of the same in the bottom of the concave for passage through openings in said bottom of the concave to thereby add to the efficiency of the separating process.

In the accompanying drawings, Figure 1 is a plan view of my invention. Fig. 2 is a longitudinal sectional view taken on a plane to one side of the cutting mechanism. Fig. 3 is a transverse section. Fig. 4 is a detail view of the mechanism for preventing the grain from being twisted around the inner roller, and Fig. 5 is a plan view of the conveyer mechanism.

Referring to the drawings, the numeral 6 indicates the main frame portion of my improved feeder, said frame portion adapted to be secured to and disconnected from any form of threshing-machine, and in the ordinary form of threshing-machine it is fitted and connected to the projecting arms which usually form a part of the separator.

Mounted in suitable bearings is a main shaft 7, said shaft having on one end a belt-pulley 8, around which is adapted to be passed a belt, (not shown,) which is extended to and passed around a pulley carried by the actuating mechanism of the threshing-machine. Mounted upon shaft 7 is a pinion 9, which pinion meshes with a gear-wheel 10, mounted on a shaft 11, said gear-wheel in turn meshing with another gear-wheel 12 on an upper shaft 13.

The carrier mechanisms are adapted to feed inwardly from opposite sides of the machine, and each carrier mechanism is provided with end pieces 14 14 and the outer rolls 15 15 and the inner rolls 16 16, the journals of said rolls having their bearings in the end pieces 14 14 of the carrier-frame. Endless chains 17 pass around the rolls, and said chains are connected by means of longitudinal flat strips or bars 18, which serve when the chains are in motion to carry the grain inwardly toward the cutting mechanism hereinafter referred to, the said grain lying on platforms 19, arranged below the upper portion of the chains, as clearly shown in Figs. 1 and 3. The endless chains 17 are preferably in the form of sprocket-chains, and the inner rolls 16 have sprocket-teeth 20 projecting therefrom, which the sprocket-chains engage. By this connection the endless-carrier mechanisms are driven from the main shaft 7 through the intermeshing of the gear-wheels 9, 10, and 12 and the intermeshing of the beveled gears 22 and 21. Each roll 16 has projecting radially therefrom a number of blades 26, having their outer edges advisably serrated. These blades are shown as composed of a series of short sections extending only a portion of the length of the roll. I do not, however, limit myself to this particular arrangement, as it is obvious that, if preferred, such blades could extend longitudinally of the rolls or substantially the entire length of said rolls without departing from the spirit and scope of my invention, and the sprocket-teeth 20 could be at opposite ends of the roll and beyond the ends of the blades if continuous blades are used.

Parallel with the end pieces 14 of the carrier mechanisms are rods 27 27. The opposite ends of each of these rods are held fast in projection 28 28, extending from the main fixed portion of the framework. The end pieces 14 have extending upwardly therefrom eyed projections 29 29, through which the rods freely pass. The rods 27, as stated, are held fast, and they form rails upon which the end pieces 14 of the carrier mechanisms are adapted to move. These end pieces 14 are made movable by providing the under edges thereof with rack-teeth 30 30, which teeth are engaged by pinions 31 31, carried on the extremities of longitudinal shafts 32 32, the opposite ends of said shafts having hand-wheels 33 33 thereon. When these hand-wheels are turned, it is obvious that the pinions are made to engage the rack-teeth, and consequently the outer end pieces 14 are moved either inwardly or outwardly, in accordance with the direction of turning. The object of this construction is to permit the carrier-frames to be adjusted at any time to suit the different conditions of the grain and the amount to be fed to the cylinder. If the grain is dry and easily threshed, a wide space can be provided between the carriers and the cutting mechanism, so as to allow a large quantity of grain to pass through, whereas if the grain is wet and hard to thresh the space is narrowed. When the carriers are moved inwardly toward each other, the beveled pinions 21 and 22 are maintained in mesh, inasmuch as the bearings 34 34 of the shaft 13, on which the pinions 22 are splined, project outwardly from the end pieces 14 and are movable on the shaft 13.

Cutting mechanism is provided for each carrier mechanism and may be of any desired construction. In the drawings I show each cutting mechanism as consisting of a stationary toothed or serrated blade 35 and a movable toothed or serrated blade 36, the two blades together adapted to effect a shearing cut. These blades are mounted between two stationary longitudinal angle-beams 37 37 and a movable upper plate 38, the said angle-beams 37 being secured to the rods 27 by means of clips 39. The lower stationary blades 35 are secured to the angle-beams 37 and the upper blades 36 to the plate 38. A longitudinal reciprocating movement is imparted to the plate 38, and as the blades 36 are connected to said plate a like movement of course is necessarily imparted to said blades. This reciprocation of the plate is accomplished by means of a pitman 40, having its upper end connected to the plate and its lower end connected to a crank 41 formed on the shaft 13.

Below each carrier-frame and extending from a cross-bar 42 are a series of arms 43. To the inner ends of these arms is connected a plate 44, having its inner edge serrated. By the provision of this construction in the operation of the machine if any of the grain is carried around by the wings of the rollers 16 beyond the point where such grain should be deposited onto the conveying mechanism the said grain so carried around will come in contact with the serrated edges of the plates 14, and said plates will thereby act to disengage such grain from the blades of the rolls 16 and permit the grain to drop.

In the operation of the carrier mechanism the said mechanism is driven through the intermeshing gears 9, 10, and 12, the intermeshing beveled pinions 22 and 21, and the sprocket-chains 17. The tied bundles of grain are now placed lengthwise on the platforms 19 and being acted upon by the flat strips or bars 18, which connect the endless chains 17, are carried inwardly thereby until they reach the blades 26 of the inner rolls 16, which blades carry the grain to the cutting mechanism. The knives of the cutting mechanism act upon the bands or cords of the bundles and sever the same. The loose grain as soon as the cords are cut falls onto the conveying mechanism below. It will be seen that each carrier mechanism, of which the inner roll with the projecting wings 26 forms a part, is in the same or substantially the same plane with the cutting mechanism, and as the grain is carried over the inner roll by the action of the wings 26 the said grain is thereby carried into direct contact with the cutting mechanism.

In most forms of carrier mechanism the endless carriers thereof are provided with projecting fingers which when the bundles are deposited on the endless carriers act to carry said bundles along with too much force during the entire movement of the bundles, whereas considerable force is only required at the inner end of the travel of the bundles or at the time said bundles are forced against the cutting mechanism. By my improved construction the flat strips or bars 18 carry the bundles along at a moderate force, and then the moment said bundles have traveled inwardly far enough to permit them to be engaged by the blades of the inner rolls 16 said blades cause the bundles to complete their travel toward and against the cutting mechanism with considerable force, and thus an augmented force is provided only at the point of the travel of the bundles where it is most necessary—i. e., where said bundles are forced against the cutting mechanism. The wings also serve to separate the bundles and deliver them in a separated condition to the conveyer.

Referring to the conveyer mechanism, the numeral 46 indicates the bottom of the conveyer-frame, and 47 47 the side boards of said frame. The bottom board is preferably made of two sections hinged together at the point 48, so as to provide for one of said sections being turned down on the hinge. This section is normally held up by means of a transverse bar 49, extending beneath the same from one side board of the conveyer to the other. This transverse bar is held in place by means of a longitudinal locking-bar 50, having one end thereof extending beneath the transverse bar and secured thereto by means of a nut 51, turned thereagainst on a bolt 52. The opposite end of the locking-bar extends through a sleeve 53, depending from the under side of the hinged portion of the bottom board and held therein by means of a hand-screw 54, turned thereagainst. The free end of the hinged section of the bottom board is supported upon a straight extension 55 from the concave 56. The outer end of the conveyer-frame is supported or hung on coiled springs 57. When it is desired to obtain free access to the bottom board of the conveyer-frame for the purpose of cleaning or for any other reason, the nut 51 is removed and the outer end of the locking-bar disengaged from the bolt 52 and the opposite end of said bar then disengaged from the sleeve 53 by loosening the hand-screw 54. The conveyer-frame is now forced forwardly against the action of the springs 57 until the inner free end of the hinged section of the bottom piece of said frame is clear of the extension 55 of the concave. The hinged section of the bottom board is now free to turn downwardly on its hinge, and ready access to the upper side of the bottom board is thereby obtainable.

The forward ends of the side boards 47 of the conveyer-frame are provided with elongated slots 58, and through these slots passes the shaft 11, hereinbefore referred to, the ends of said shaft being journaled in fixed portions of the main framework of the machine. On this shaft are carried sprocket-wheels 59 59. A shaft 60 has its ends fixed in the side boards 47 of the conveyer-frame at the inner ends of said side boards, and upon this shaft are idle sprocket-wheels 61 61. Around the sprocket-wheels 59 and 61 pass sprocket-chains 62 62, and these chains are connected by means of transverse slats 63 to constitute a conveyer-belt. Below the upper portion of the endless conveyer thus formed is a platform 64, which is connected to the side boards of the conveyer-frame and upon which the grain carried by the endless conveyer rests. Depending from the under side of this platform are lugs 65, and through these lugs adjusting-screws 66 pass, the outer ends of said screws engaging collars 67, fixed on the shaft 11. It is obvious that when it is desired to tighten or slacken the endless conveyer all that is necessary to be done is to turn the adjusting-screws 66 in the proper direction, and the entire conveyer-frame will be moved on the shaft 11 by reason of the provision of the elongated slots 58. In the operation of this conveyer mechanism the grain after it is acted upon by the cutting mechanism falls onto the forward or outer end of the endless conveyer and is carried thereby toward and to the cylinder or drum 68, said cylinder and the concave 56 being shown by dotted lines in Fig. 2.

Experience has demonstrated that the fanning action caused by the revolution of the cylinder is apt to blow back some of the grain into the bottom of the frame of the conveyer mechanism and beneath the endless conveyer and in a short time clog up the space beneath said endless conveyer. To provide against this, I employ at the inner end of the conveyer-frame and on a plane below said inner end a revoluble roller 69, having a series of inclined blades 70 extending therefrom. This roller may be rotated in any desirable manner; but I prefer to rotate the same from the shaft 11 by mounting on said shaft another sprocket-wheel 71 and passing a sprocket-chain 72 therearound and extending said chain to and around a sprocket-wheel 73, mounted on the axis of the roller 69. The slanting teeth of the roller 69 effectually prevent the grain from being blown back beneath the endless conveyer, and hence avoid the difficulty above pointed out of the clogging up of the parts. The inclined teeth furthermore act to catch any loose grain and in the revolution of the roller carry any such loose grain which may be caught thereby to the concave, where it passes out through openings in said concave, thereby adding to the efficiency of the separating process.

It will be seen that in the construction of my conveyer mechanism an endless conveyer is employed in lieu of the complicated forcing mechanisms usually used and that also there is included in connection therewith a simple means for taking up slack in said endless conveyer. At the upper end of the conveyer is a curved guide-plate 75, approximately concentric with the shaft 11 in the position shown and about the same distance from the path of the slats 63 when the conveyer is tightened as is the bottom board 46. By this means whatever grain does pass roller 69 and is carried back to the conveyer will not pack at the upper end of the frame, and so clog the conveyer, but will be held by the curved plate 75 into active engagement with the slats 63 to be raised thereby onto the conveyer again with the other grain and carried to the concave.

What I claim as my invention is—

1. In a feeder for threshing-machines, the combination of side carrying mechanism consisting of an endless conveyer adapted to carry the bundles of grain inwardly, cutting mechanism arranged a distance from the inner edge of the carrying mechanism, and a rotatable roll around which the endless conveyer passes, said roll provided with projections adapted to take the bundles of grain from the carrying mechanism and carry said grain over the roll and to the cutting mechanism, said cutting mechanism and carrying mechanism being in the same, or substantially the same, horizontal plane.

2. In a feeder for threshing-machines, the combination of side carrying mechanism consisting of an endless conveyer adapted to carry the bundles of grain inwardly, cutting mechanism arranged a distance from the inner edge of the carrying mechanism, and a rotatable roll around which the endless conveyer passes, said roll provided with projecting wings adapted to take the bundles of grain from the carrying mechanism and carry said grain over the roll and to the cutting mechanism, the outer edges of said wings being serrated, said cutting mechanism and carrying mechanism being on the same, or substantially the same, horizontal plane.

3. In a feeder for threshing-machines, the combination of side carrying mechanism consisting of an endless conveyer adapted to carry the bundles of grain inwardly, cutting mechanism arranged a distance from the inner edge of the carrying mechanism, and a rotatable roll around which the endless conveyer passes, said roll having a series of short longitudinally-projecting wings extending therefrom, the opposed ends of said wings being out of contact, and wheels mounted on the roll in the spaces between the opposed ends of the wings, said wheels adapted for the passage therearound of the belts of the endless conveyer.

In testimony whereof I affix my signature in presence of two witnesses.

JOHN M. SAILER.

Witnesses:
  A. L. MORSELL,
  ANNA V. FAUST.